UNITED STATES PATENT OFFICE.

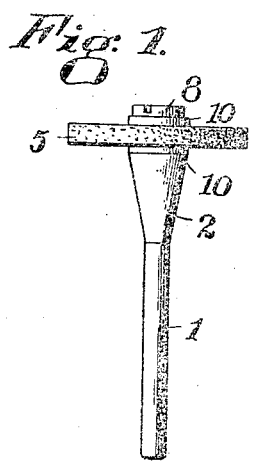
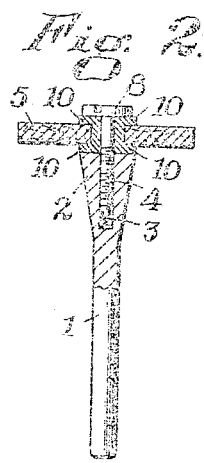
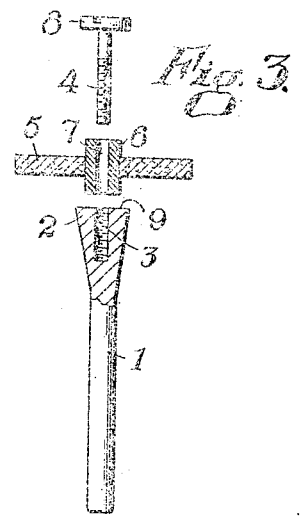
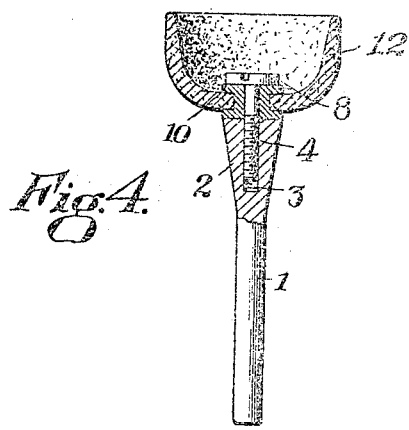
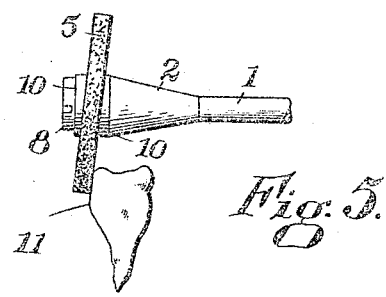

CHARLES H. DAVIS, DECEASED, LATE OF WORCESTER, MASSACHUSETTS, BY BERTHA B. DAVIS, EXECUTRIX, OF BOSTON, MASSACHUSETTS.

DENTAL TOOL.

1,294,423.  Specification of Letters Patent.  Patented Feb. 18, 1919.

Original application filed February 2, 1915, Serial No. 5,790. Divided and this application filed November 14, 1917. Serial No. 202,050.

*To all whom it may concern:*

Be it known that CHARLES H. DAVIS, deceased, a citizen of the United States, formerly residing at Worcester, in the county of Worcester and State of Massachusetts, invented a new and useful Improvement in Dental Tools, of which the following is a specification accompanied by drawings forming a part of the same, said specification being a division of application Serial No. 5,790, filed by said Charles H. Davis on or about February 2, 1915.

The invention described herein relates particularly to that class of dental tools which embody a rotating mandrel and a grinding member carried by said mandrel for the purpose of grinding, cleansing, and polishing teeth, and the objects of my improvement are to provide a simple and inexpensive means for attaching the grinding member to the rotating mandrel, and for securing a yielding action to the periphery of the grinding member, by which the latter may be tipped by its pressure against a tooth into an angle oblique to the axis of the grinding mandrel. I attain these objects by the construction and arrangement of parts as hereinafter described and illustrated in the accompanying drawings, in which—

Figure 1 is a side elevation of a dental tool embodying my invention.

Fig. 2 is a side elevation shown in longitudinal sectional view.

Fig. 3 represents the different parts of my dental tool slightly separated from each other, and in position to be assembled.

Fig. 4 is a central sectional view showing a modification of the grinding member.

Fig. 5 is a side elevation showing the grinding member tipped at an oblique angle to the axis of the driving mandrel.

Similar reference letters refer to similar parts in the different figures.

Referring to the drawings, 1 denotes a mandrel adapted to be held in the rotating shaft of a dental engine. The mandrel 1 is provided with a conical tip or head 2 having an axial screw threaded hole 3 to receive a binding screw 4. 5 denotes a grinding wheel or disk, in the center of which is inserted a flexible sleeve 6, considerably longer than the thickness of the grinding disk 5. The sleeve 6 is formed of any suitable soft resilient material, such for example, as soft rubber, and is provided with a central hole 7 to receive the binding screw 4. The head 8 of the binding screw is preferably larger than the diameter of the sleeve 6.

In assembling the parts which are shown separated in Fig. 3, the screw is passed through the hole 7 and engages the screw threaded hole 3 of the mandrel, with the lower end of the sleeve resting against the face 9 of the cone shaped head 2 of the mandrel. The face 9 is at right angles to the axis of the mandrel, and as the binding screw 4 is screwed into place, the two ends of the resilient sleeve 6 become expanded, forming flanges 10, Fig. 2, by the compression of the resilient sleeve between the cone shaped head 2 of the mandrel and the head 8 of the screw. As the binding screw is tightened, the flanges 10, 10, become compressed between the disk 5 and the cone shaped head of the mandrel, and also between the disk 5 and the head 8 of the screw. Sufficient resilience, however, will remain in the flanges 10, 10, to allow the grinding disk 5 to be slightly tipped by the pressure of its edge against a tooth, as shown in Fig. 5. The frictional contact of the flanged ends of the sleeve 6 against the cone shaped head of the mandrel and the head of the screw will be sufficient to cause the disk 5 to be rotated by the rotation of the mandrel, and at the same time permit a slight inclination of the grinding disk relatively to the axis of the mandrel, as illustrated in Fig. 5.

The above described construction is extremely cheap, as it only requires the insertion of a straight resilient sleeve 6 in the central hole of the ordinary grinding wheel or disk, and the construction of the mandrel requires only an enlargement of its end, which in the present embodiment is made cone shaped, although a flat disk attached to the end of the mandrel would provide a sufficient frictional surface to insure the rotation of the grinding disk. The amount of resilience remaining in the flanged ends of the sleeve 6 may readily be determined by the force with which the flanges are compressed, a slight compression giving the greater resilience.

In Fig. 5 a tooth being ground is represented at 11, and the grinding disk 5 is represented as being tipped at an oblique angle to the axis of the mandrel 1 by the pressure of its periphery against the side of the tooth. This yielding action of the grinding disk is permitted by the resilience of the flanges 10, the flanges being compressed on one edge and expanded by their resilience on the opposite edge.

In Fig. 4 a modification is shown in the form of the grinding disk represented as cup shaped, as at 12. In the construction of my improved dental tool, I cheapen the construction by inserting the straight resilient sleeve 6 through the center of the grinding disk 5, as shown in Fig. 3, and I form the flanges 10, 10 as shown in Fig. 2, by the compression of the resilient sleeve between the cone shaped head of the mandrel and the head 8 of the binding screw. It is obvious, however, that the same yielding action of the grinding disk as illustrated in Fig. 5 would be secured if the resilient sleeve were formed with flanges 10, 10, before it was inserted in the grinding disk 5. The use of the straight sleeve 6 is, however, the preferred embodiment of my invention.

Claims:—

1. In a dental tool of the class described, a rotating mandrel, a grinding disk having a central hole, a resilient sleeve of greater length than the thickness of the disk inserted in said central hole, a binding screw engaging a screw threaded axial hole in said mandrel and having a head overlapping the end of said resilient sleeve, whereby the ends of said sleeve are flanged upon the opposite sides of said grinding disk.

2. In a dental tool of the class described, a rotating mandrel, a grinding disk and means for attaching the grinding disk to said mandrel, comprising a resilient sleeve inserted in the grinding disk, and of greater length than the thickness of the disk, and means for compressing the ends of said resilient sleeve, whereby resilient flanges are formed upon opposite sides of the grinding disk.

3. In a dental tool of the class described, a rotating mandrel, a grinding disk having a central hole, a sleeve inserted in said grinding disk provided at its ends with resilient flanges overlapping the sides of the grinding disk, and means for binding said sleeved grinding disk upon the end of said mandrel.

4. In a dental tool of the class described, a rotating mandrel having an enlarged tip or head and an axial screw threaded hole, a grinding disk, a binding screw engaging the screw threaded hole in the mandrel and having an enlarged head by which the grinding disk is held in position, and resilient members interposed between the enlarged head of the mandrel and the grinding disk, and between the grinding disk and the enlarged head of the binding screw, whereby a yielding action is permitted to the grinding disk.

5. In a dental tool of the class described, a rotating mandrel, a grinding disk, means for binding the disk against the end of the mandrel, a resilient member between the end of the mandrel and the grinding disk, and a second resilient member between the grinding disk and said binding member, whereby the disk is permitted to assume an oblique position relatively to the axis of the mandrel by the compression of said resilient members.

6. A grinding disk having a central opening passing entirely through the same, and a soft removable yieldable center core secured in said opening.

7. A grinding disk provided with a removable rubber center core.

8. A grinding disk having a central opening and a yieldable center core provided with a central hub adapted to have holding engagement with said opening, and further provided with side flanges adapted to engage the opposite faces of said disk, whereby said core is removably secured to said disk.

9. As a new article of manufacture, a soft yieldable center core for grinding disks, comprising an apertured central hub provided with integral positioning end flanges.

BERTHA B. DAVIS,
*Executrix of Charles H. Davis, deceased.*

Witnesses:
MARGARET L. FERRIN,
SAMUEL H. CANFIELD.